May 15, 1945.  A. AEPPLI  2,376,110
MACHINE FOR MACHINING SCREW GEARS
Filed Nov. 12, 1943  3 Sheets-Sheet 1

Inventor:
Albert Aeppli
by Sommers Young
Attorneys

May 15, 1945. A. AEPPLI 2,376,110
MACHINE FOR MACHINING SCREW GEARS
Filed Nov. 12, 1943 3 Sheets-Sheet 2
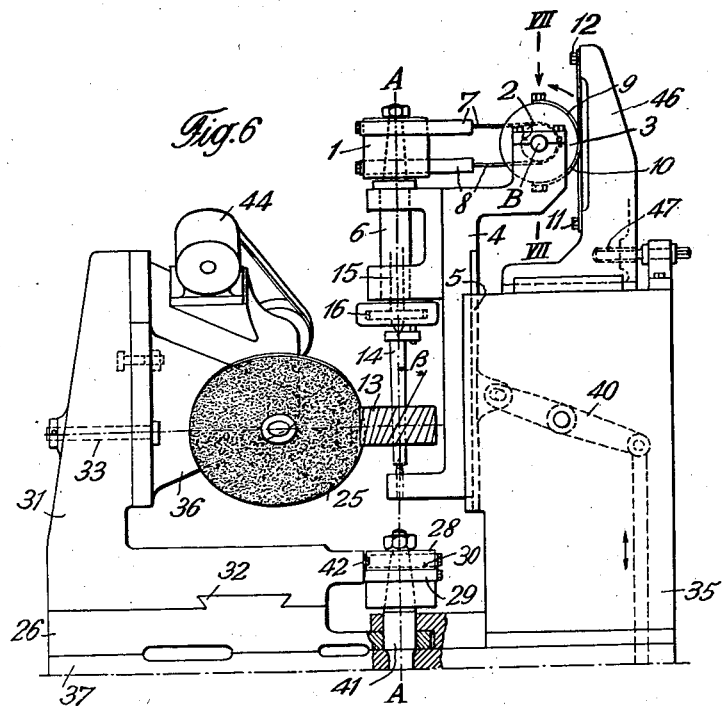
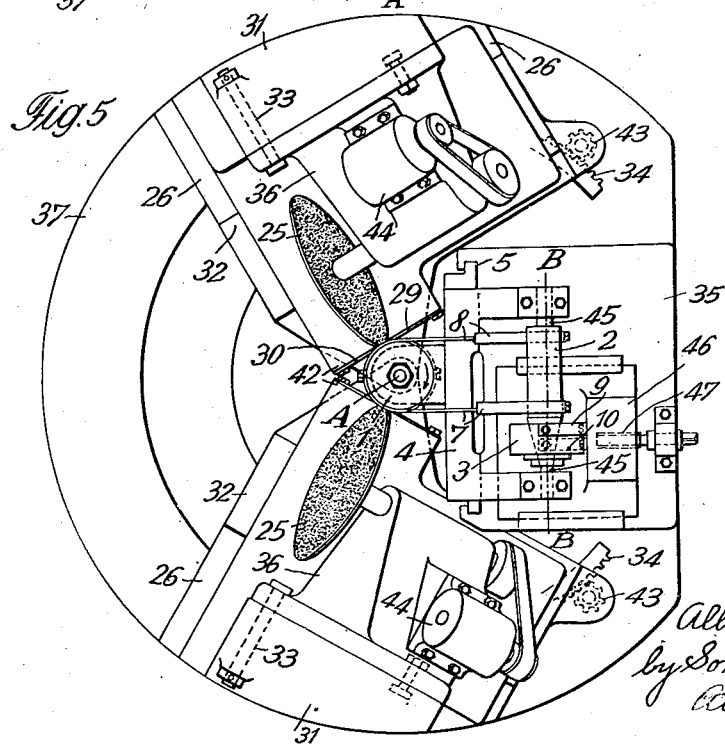
Inventor:
Albert Aeppli
by Sommers & Young
Attorneys

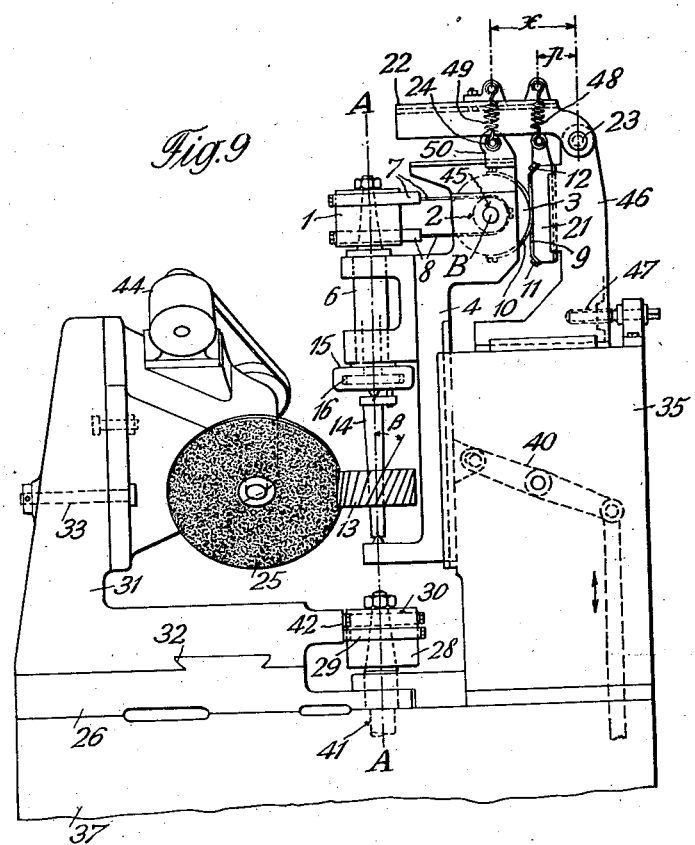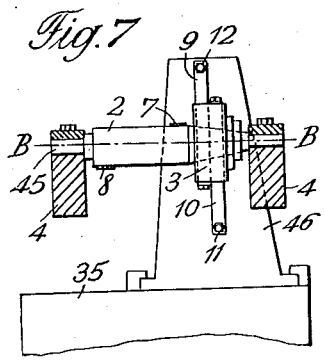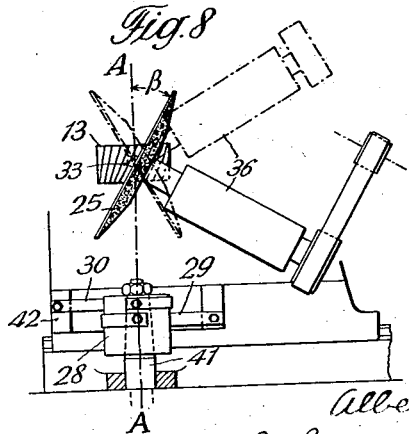

Patented May 15, 1945

2,376,110

UNITED STATES PATENT OFFICE 2,376,110

MACHINE FOR MACHINING SCREW GEARS

Albert Aeppli, Zurich, Switzerland, assignor to Maag-Zahnräder und-Maschinen Aktiengesellschaft, Zurich, Switzerland Application November 12, 1943, Serial No. 510,030
In Germany June 30, 1942

8 Claims. (Cl. 51—123)

This invention relates to machines for machining screw gears, particularly grinding of the flanks of spur gears with helical teeth.

It is known to derive the helix to be chosen in using gear grinding machines operating either on the principle of relative rolling motion between parts or by means of a profile-generating disc from the feed movement of the work slide, in such manner, that a driving member sliding in a guide extending obliquely to the feed direction is employed and is diverted at right angles to the advance feed by action of the movement of the slide, whereby the work is rotated to an extent corresponding to the helix.

This method in being carried into effect has its limitations. Neither gears having relatively great angles of tooth obliquity can be machined in this way nor can the method be applied in cases in which, as for example in connection with machines operating by means of tooth-profile generating discs, the feed movement of the tool slide must be relatively fast. In the former case the pressure exerted by the driving member on the guideway of great inclination would become so high that movement transmission would be frustrated. In case of rapid feed movement premature wear on the guideway ensues, particularly if gears with relatively great tooth obliquity are to be ground.

According to the present invention these drawbacks are eliminated in that in the slide effecting the axial advance feed of the work a rolling cylinder is mounted transversely of the work axis so as to be capacitated for rolling movement along a path parallel with the axis of the work and connected with the work spindle by means for transmitting its rotational movement.

The invention is applicable for the machining of gears of relatively great as well as small angles of tooth obliquity, whilst the setting up of play between the parts for producing the helix as well as wear on said parts is positively prevented.

An embodiment of the invention is illustrated, by way of example only, in the accompanying drawings in which Fig. 1 shows an elevation of the work slide inclusive of means for producing the helical movement of the work;

Fig. 5 is a top plan view of the grinding machine including the slide shown in Fig. 1 and operating on the principle of relative rolling motion;

Fig. 6 shows an elevation corresponding with Fig. 1;

Fig. 7 shows a side elevation of the machine depicted in Fig. 6 partly in section on the line VII—VII in Fig. 6;

Fig. 8 is a partial view of the machine shown in Fig. 6, as seen from the right hand side, and Fig. 9 shows an elevation of the machine operating on the principle of relative rolling motion and including the device shown in Fig. 3.

Figure 1:
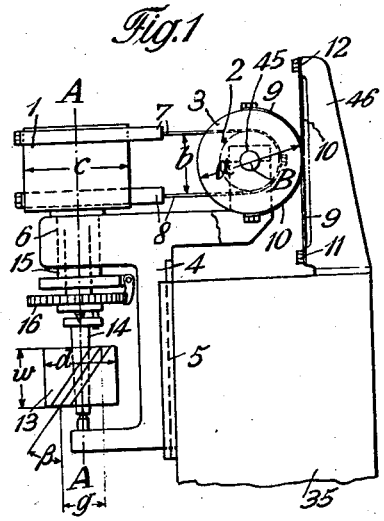

In the grinding machine operating on the principle of relative rolling motion as shown in Figs. 5 and 6 the required relative movements between the work and the tools are separated, in such manner, that the work performs the requisite axial advance feed, the necessary simultaneous rotational movement for producing the helical movement and the dividing movement, whereas the grinding discs are subjected to the rolling movement apart from their rotational movement.

To this end on a vertical guideway 5 on a standard 35 secured to a bed 37 a slide 4 is arranged which has vertical reciprocatory movement imparted thereto by a suitable driving gearing as indicated at 40. In this slide the work spindle 6 is non-displaceably mounted. The latter carries a dividing head 15 the dividing disc 16 of which being rotationally fed step by step is connected with the mandrel 14 carrying the work. This mandrel is rotatably mounted between centering points on the dividing head and on the slide 4 free from play.

During the vertical reciprocating movement of the slide 4 the work spindle 6 has imparted thereto a rotational movement which is derived from the reciprocating movement. The means serving this purpose are hereinafter described.

On the bed 37 two grinding disc carriers are arranged which are symmetrical relative to each other so that only one of these carriers need be described in detail. The carrier is formed by a supporting plate 26 which is pivotally adjustable about a pin 41 which is fastened to the bed 37 in coaxial relation with the work and provided with a slide track 32 extending transversely to said pin. This slide track guides a slide 31 which bears, by means of a sliding edge 42, against a rolling cylinder 28 sustained by the pin 41 by means of a sliding edge 42 extending parallel with the slide track 32 and is connected with said cylinder by means of rolling tapes 29, 30 (Fig. 8).

Further a driving gearing is provided which imparts swinging motion to the supporting plate 26. For this purpose the supporting plate 26 is provided with an arcuate rack 34 which is coaxial with the pin 41 and meshes in a pinion 43 which is mounted in the bed 37. This pinion has imparted thereto alternate driving impulses in opposite directions by means not shown. During the swinging movement of the supporting plate 26 the slide 31 rolls on the rolling cylinder 28.

The slide 31 forms a standard with a horizontal pivot pin 33 extending radially of the axis A—A of the work and with a guide surface extending at right angles thereto and serving for guiding a disc holder 36 which pivots on the pin 33 and can be clampingly fixed in various angular positions. The holder 36 carries the spindle of the grinding disc 25, which is perpendicular to the pin 33, and a driving motor 44 for said spindle.

The edge of the grinding disc 25 describes an involute movement at the grinding position when the supporting plate 26 swings about the pin 41. By this means the flank of the tooth is ground in accordance with the profile required.

Figure 2:
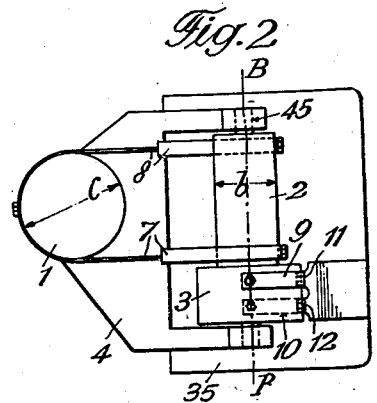
Fig. 2 is a top plan view corresponding to Fig. 1.

For grinding the tooth flank throughout its full length the work is displaced by means of a slide 4. During this displacement the work must also rotate about its axis for effecting relative helical motion between the grinding disc and the work. For this purpose the following means are serving:

In the slide 4 a shaft 45 is mounted in a position transversely of the axis A—A (Fig. 5) and is connected with a rolling cylinder 3 surrounding it. This cylinder rolls on a track extending parallel with the axis of the work and is connected with the spindle 6 by means for transmitting its rotational movement to said spindle. The rolling track is formed by the vertical front face of a slide 46 which slide is displaceably guided on the standard 35, by means of a slide track extending radially of the axis A—A, and is adjustable and fixable in adjusted position by a screw spindle 47. The tapes 9 and 10 (Figs. 1 and 2) which are secured at their respective ends to the slide 46 at 11 and 12 and to the cylinder 3 positively enforce relative rolling movement devoid of play.

Advantageously, the cylinder 3 is arranged for being readily interchanged with other cylinders of different diameters. In effecting such an interchanging the slide 46 must be adjusted in accordance with the radius of the rolling cylinder by means of the spindle 47.

In order to transmit the rotational movement of the shaft 45 to the spindle 6 the following arrangement is provided:

On the upper end of the spindle 6 a cylindrical pulley 1 is fastened and is connected by means of tapes 7, 8 with a cylindrical pulley 2, being secured to the shaft 45, in a manner similar to that provided in crossed belt drives. The two tapes 7 and 8 extend between the belt pulleys 1 and 2 in parallel relation to each other and at right angles to the spindle 6 and the shaft 45, as evident from Figs. 1, 2, 3 and 6. By this means the transmission of the rotational movement from the shaft 45 to the spindle 6 is effected free from play. With a view to obtaining the helix required the rotation of the work 13 must be determined by the rolling cylinder diameters in such manner that in function of a travel $w$ (Fig. 1) the gear moves through an angular range corresponding to an arc length $g$ on the rolling circle periphery.

This relation exists if $$tg\beta = \frac{g}{w} = \frac{d}{c} \cdot \frac{b}{a}$$

when $a$, $b$ and $c$ represent the diameters of the three rolling cylinders.

Since it is advisable to reduce the number of rolling cylinders to a possible minimum, at least one of the rolling cylinder diameters is maintained invariable in length. The best solution from the constructional point of view is obtained if the diameter $b$ of the rolling cylinder 2 is maintained invariable and only the two cylinders 1 and 3 having diameters $c$ and $a$ respectively are exchanged or even only one of these is exchanged at a time.

It may happen that the obliquity angle $\beta$ of a gear does not exactly agree with that of its mating gear if, for example, the diameters of the rolling cylinders used in effecting the grinding deviate somewhat from their calculated values. In such cases the diameter of one of the rolling cylinders must be changed to some extent in order to obtain equal tooth obliquity angles for both gears. This slight alternation is obtained in simple manner suchwise that the diameter of one of the cylinders, advantageously the one which ordinarily is left unchanged, namely the cylinder 2, is slightly varied.

Figure 4:
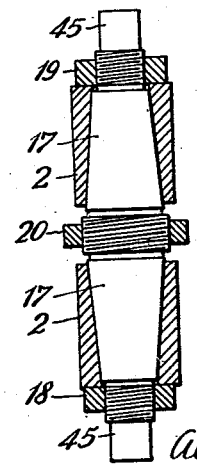
Fig. 4 is a longitudinal section of an element shown in Figs. 1 to 3.

To this end the cylindrical pulley 2 is constructed so as to be expansible. In the construction shown in Fig. 4 the shaft 45 is provided with two conical sections 17 of opposite inclination. On this shaft the two halves of the transversely split pulley 2 having conical bores are mounted. Said halves can be shifted in one or the other direction by screw nuts 18 to 20 for the purpose of enlarging or reducing their diameters.

Figure 3:
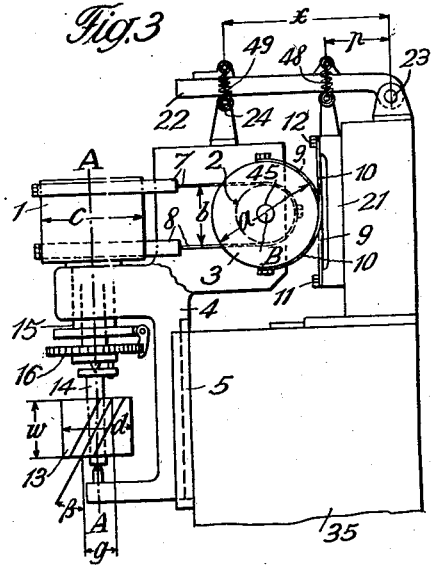
Fig. 3 is an elevation of a modification of the work slide.

A further form of the device for rotating the spindle 6 is shown in Figs. 3 and 9. In this arrangement the track along which rolls the cylinder 3 is formed by a slide 21 which is displaceable along a slide track for the slide 46 (Fig. 9) extending parallel with the axis A—A. Accordingly the rolling tapes 9 and 10 of the cylinder 3 are secured to this slide 21 at 11 and 12 and on the cylinder respectively.

The slide 21 carries a roller which is kept in bearing engagement with a lever 22 which is pivotally mounted on a horizontal bolt 23 on the slide 46 and extends radially of the axis A—A. The lever 22 is urged against a roller 24 firmly connected to the slide 4 by a second spring 49. Due to this arrangement the axial advance feed of the slide 4 is transmitted to the slide 21 at a predetermined ratio of gearing.

In order to permit of varying the pitch angle $\beta$ of screw thread of the tooth system without requiring any rolling cylinders to be exchanged, advantageously, the said ratio of leverage is made variable. This can be effected by arranging the upstanding support 50 carrying the roller 24 on a slide track of the slide 4 which extends radially of the axis A—A and on which said support is displaceable and fixable in adjusted position. By this means the distance $x$ of the roller 24 from the pivot bolt 23 can be varied.

If the distance of the roller on the slide 21 from the pivot bolt 23 is designated by $p$ it is $$tg\beta = \frac{d \cdot b}{c \cdot a} = \frac{x-p}{x}$$

Obviously, instead of providing for the point 24 to be displaceable another point, for example 26, may be displaceably arranged or the fixed point may be disposed to come to lie between the slide 21 and the slide 4. The formula for $tg\beta$ would then have to be changed accordingly. The arrangement including the leverage is of particular advantage if widely differing gears have to be ground and thus many arcuate rolling tracks must be made.

Although the rolling cylinders and cooperative rolling tapes have the advantage of operating devoid of play they may be replaced by toothed racks and cooperative gears.

This invention is not limited to grinding machines as it could be applied also to other tooth system generating machines.

I claim:

1. In a machine for grinding spur gears with helical teeth, a rotatably mounted spindle for carrying a spur gear workpiece coaxially therewith for the circumferential grinding of said workpiece, a rolling cylinder centered on said work axis, a second rolling cylinder arranged with its axis extending perpendicularly to the axis of the workpiece for conjoint rotation of said two cylinders, a third rolling cylinder fixedly centered on a common axis with said second cylinder, stationarily anchored rolling means connected to said third cylinder so as to extend rectilinearly away from the latter cylinder, and means for shifting said common axis parallel with the axis of the workpiece carried by said spindle for rotating said third cylinder for producing relative helical motion between said workpiece and said point of grinding by action of said stationarily anchored rolling means.

2. In a machine for grinding spur gears with helical teeth, a rotatably mounted spindle for carrying a spur gear workpiece coaxially therewith for the circumferential grinding of said workpiece, a rolling cylinder coaxially secured to said work spindle for driving same, a second rolling cylinder arranged with its axis extending perpendicularly to said work-carrying spindle for joint rotation of said work-carrying spindle driving cylinder and said second cylinder, a third rolling cylinder fixedly centered on a common axle with said second cylinder, stationarily anchored intercrossing rolling tapes connected to said third cylinder so as to extend rectilinearly away from the latter cylinder, and means for shifting said common axle parallel with the axis of the workpiece carried by said spindle for jointly rotating said three cylinders for producing relative helical motion between said work and said point of grinding by action of said stationarily anchored intercrossing tapes.

3. In a machine for grinding spur gears with helical teeth, a rotatably mounted spindle for carrying a spur gear workpiece coaxially therewith for the circumferential grinding of said workpiece, a rolling cylinder coaxially secured to said work-carrying spindle for driving same, a second rolling cylinder arranged with its axis extending perpendicularly to said work spindle for joint rotation of said work spindle driving cylinder and said second cylinder, a third rolling cylinder fixedly centered on a common axle with said second cylinder having a diameter differing in length from that of said third cylinder, stationarily anchored intercrossing rolling tapes connected to said third cylinder so as to extend rectilinearly away from the latter cylinder, and means for shifting said common axle parallel with the axis of the workpiece carried by said spindle for jointly rotating said three cylinders for producing relative helical motion between said workpiece and said point of grinding by action of said stationarily anchored intercrossing tapes.

4. In a machine for grinding spur gears with helical teeth, a rotatably mounted spindle for carrying a spur gear workpiece coaxially therewith for the circumferential grinding of said workpiece, a rolling cylinder coaxially secured to said work-carrying spindle for driving same, a second rolling cylinder having a constant diameter arranged with its axis extending perpendicularly to said work spindle for joint rotation of said work spindle driving cylinder and said second cylinder, a third rolling cylinder fixedly centered on a common axle with said second cylinder of constant diameter, means for varying the diameter of said first and that of said third rolling cylinder for varying the speed ratio of said two cylinders, stationarily anchored intercrossing rolling tapes connected to said third cylinder so as to extend rectilinearly away from the latter cylinder, and means for shifting said common axle parallel with the axis of the workpiece carried by said spindle for jointly rotating said three cylinders for producing varied relative helical motion between said workpiece and said point of grinding in accordance with said variable speed ratio by action of said stationarily anchored intercrossing tapes.

5. In a machine for grinding spur gears with helical teeth, a rotatably mounted spindle for carrying a spur gear workpiece coaxially therewith for the circumferential grinding of said workpiece, a rolling cylinder coaxially secured to said work-carrying spindle for driving same, a second rolling cylinder having a substantially constant diameter subject to slight variation arranged with its axis extending perpendicularly to said work-carrying spindle for joint rotation of said work spindle driving cylinder and said second cylinder, a third rolling cylinder fixedly centered on a common axle with said second cylinder of only slightly varied diameter, means for varying the diameter of said first and that of said third rolling cylinder for varying the speed ratio of said two cylinders, stationarily anchored intercrossing rolling tapes connected to said third cylinder so as to extend rectilinearly away from the latter cylinder, and means for shifting said common axle parallel with the axis of the workpiece carried by said spindle for jointly rotating said three cylinders for producing varied relative helical motion between said workpiece and said point of grinding in accordance with said variable speed ratio of said first and third cylinders and slight diameter variation of said second cylinder by action of said stationarily anchored intercrossing tapes.

6. In a machine for grinding spur gears with helical teeth, a rotatably mounted spindle for carrying a spur gear workpiece coaxially therewith for the circumferential grinding of said workpiece, a rolling cylinder coaxially secured to said work spindle for driving same, a second rolling cylinder arranged with its axis extending perpendicularly to said work-carrying spindle for joint rotation of said work-carrying spindle driving cylinder and said second cylinder, a third rolling cylinder fixedly centered on a common axle with said second cylinder having a diameter differing in length from that of said third cylinder, a slide displaceably guided in the direction of said work axis by a stationary slide track, intercrossing rolling tapes anchored to said stationarily guided slide connected to said third cylinder so as to extend rectilinearly away from the latter cylinder, and means for shifting said common axle parallel with the axis of the workpiece carried by said spindle for jointly rotating said three cylinders for producing relative helical motion between said workpiece and said point of grinding by action of said stationarily anchored intercrossing tapes.

7. In a machine for grinding spur gears with helical teeth, a rotatably mounted spindle for carrying a spur gear workpiece coaxially therewith for the circumferential grinding of said workpiece, a rolling cylinder centered on the axis of the workpiece, a second rolling cylinder in circumferential engagement with a grinding disc, a rolling cylinder coaxially secured to the spindle carrying the workpiece for rotating same a second rolling cylinder arranged with its axis extending perpendicularly to said work-carrying spindle for joint rotation of said work spindle driving cylinder and said second cylinder, a third rolling cylinder fixedly centered on a common axis with said second cylinder having a diameter differing in length from that of said third cylinder, a slide displaceably guided in the direction of the axis of said workpiece by a stationary slide track, lever means for displacing said slide in accordance with the relative movement between said workpiece and said grinding disc, intercrossing rolling tapes anchored to said stationarily guided slide connected to said third cylinder so as to extend rectilinearly away from the latter cylinder, and means for shifting said common axle parallel with the axis of said workpiece for jointly rotating said three cylinders for producing relative helical motion between said workpiece and said grinding disc by action of said stationarily anchored rolling tapes.

8. In a machine for grinding spur gears with helical teeth, a rotatably mounted spindle for carrying a spur gear workpiece coaxially therewith for the circumferential grinding of said workpiece, a rolling cylinder centered on the axis of said workpiece, a second rolling cylinder for circumferential engagement with a grinding disc, a rolling cylinder coaxially secured to said work-carrying spindle for rotating same, a second rolling cylinder arranged with its axis extending perpendicularly to said work-carrying spindle for joint rotation of said work-carrying spindle driving cylinder and said second cylinder, a third rolling cylinder fixedly centered on a common axis with said second cylinder having a diameter differing in length from that of said third cylinder, a slide displaceably guided in the direction of the axis of said workpiece by a stationary slide track, lever means for displacing said slide in accordance with the relative movement between said workpiece and said grinding disc, means for varying the leverage of said lever means, intercrossing rolling tapes anchored to said stationarily guided slide connected to said third cylinder so as to extend rectilinearly away from the latter cylinder, and means for shifting said common axis parallel with the axis of said workpiece for jointly rotating said three cylinders for producing relative helical motion between said workpiece and said grinding disc by action of said stationarily anchored rolling tapes.

ALBERT AEPPLI.